United States Patent [19]

Abramczyk et al.

[11] Patent Number: 5,007,662
[45] Date of Patent: Apr. 16, 1991

[54] AIR BAG RELIEF VALVE

[75] Inventors: William M. Abramczyk, Rochester Hills; Edward I. Hull, West Bloomfield; James R. Feustel, Ann Arbor, all of Mich.

[73] Assignee: Ford Motor Company, Dearborn, Mich.

[21] Appl. No.: 421,882

[22] Filed: Oct. 16, 1989

[51] Int. Cl.[5] .......................................... B60R 21/28
[52] U.S. Cl. ................................................... 280/739
[58] Field of Search ............... 280/727, 728, 731, 732, 280/734, 739; 137/845, 855, 859, 860; 383/103, 3; 222/3, 494

[56] References Cited

U.S. PATENT DOCUMENTS

| 1,428,399 | 9/1922 | Schilling | 137/846 |
|---|---|---|---|
| 2,598,002 | 5/1952 | Landon | 137/218 |
| 2,688,979 | 9/1954 | Kendrick | 137/512.15 |
| 3,174,434 | 3/1965 | Schieve | 415/146 |
| 3,243,822 | 4/1966 | Lipkin | 2/2 |
| 3,245,428 | 4/1966 | Klimak et al. | 137/493 |
| 3,387,765 | 6/1968 | Davis | 229/120 |
| 3,432,087 | 3/1969 | Costello | 383/103 |
| 3,481,626 | 12/1969 | Fergle | 280/731 |
| 3,527,475 | 9/1970 | Carey et al. | 280/739 |
| 3,580,603 | 5/1971 | Chute et al. | 280/730 |
| 3,724,179 | 4/1973 | Leinfelt | 55/367 |
| 3,762,741 | 10/1973 | Fleck et al. | 280/729 |
| 3,840,246 | 10/1974 | McCullough, Jr. et al. | 280/738 |
| 3,905,615 | 9/1975 | Schulman | 280/739 |
| 3,957,078 | 5/1976 | Hlinsky | 137/845 |
| 4,095,750 | 6/1978 | Gilead | 137/855 |
| 4,097,065 | 6/1978 | Okada et al. | 280/739 |
| 4,181,325 | 1/1980 | Barnett | 280/739 |
| 4,351,544 | 9/1982 | Ross | 280/743 |
| 4,434,810 | 3/1984 | Atkinson | 137/493 |
| 4,620,648 | 11/1986 | Schwartzman | 137/845 |
| 4,674,532 | 6/1987 | Koyanagi | 137/512.15 |
| 4,805,930 | 2/1989 | Takada | 280/728 |

FOREIGN PATENT DOCUMENTS 2542764 4/1977 Fed. Rep. of Germany ...... 280/739

Primary Examiner—Charles A. Marmor
Assistant Examiner—Tamara L. Finlay
Attorney, Agent, or Firm—Daniel M. Stock; Roger L. May

[57] ABSTRACT

An airbag for an automotive inflatable occupant restraint system includes a valve for controlling the discharge of inflating gas from the airbag. The valve includes pivotally mounted flaps defining a discharge orifice variable in size in response to gas pressure and flow.

10 Claims, 3 Drawing Sheets

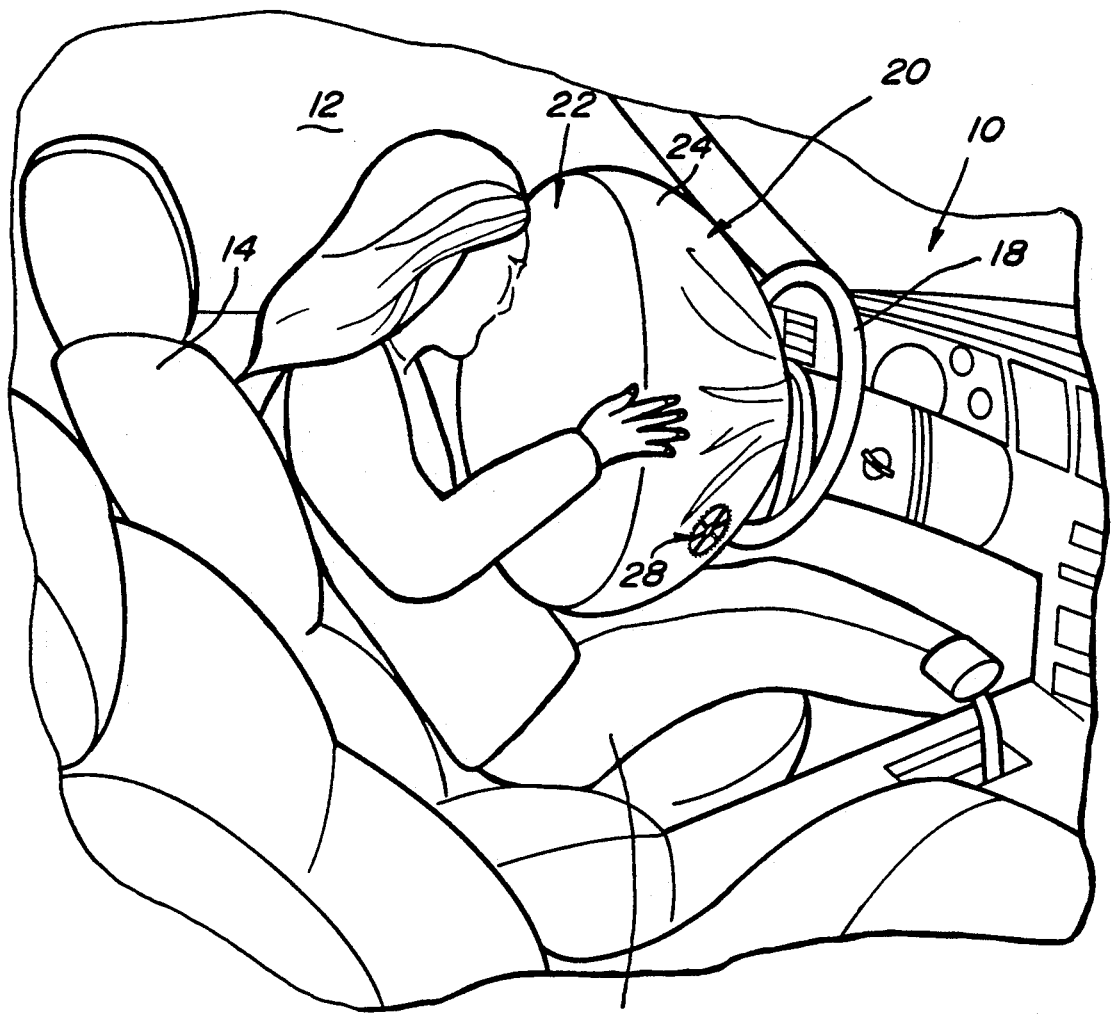
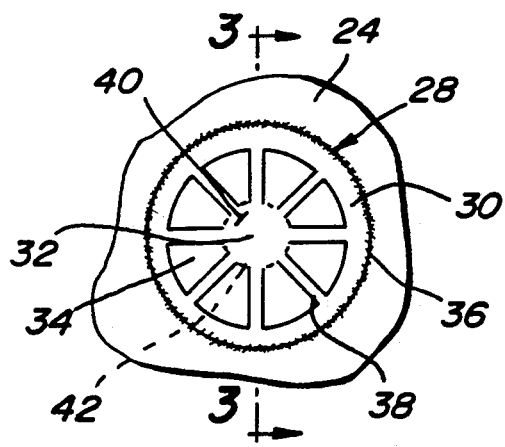
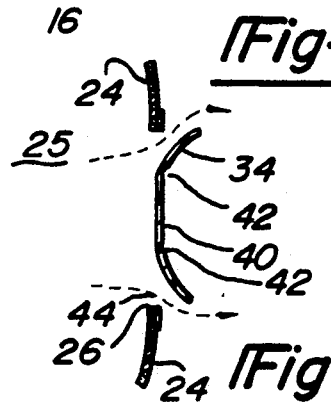
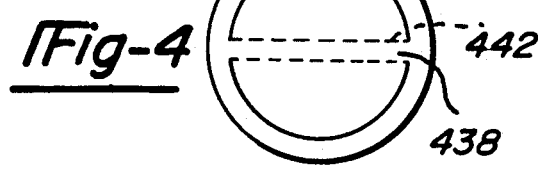
Fig-1
Fig-2
Fig-3
Fig-4

AIR BAG RELIEF VALVE

BACKGROUND OF THE INVENTION

The present invention relates generally to inflatable vehicle occupant restraint systems and more particularly to devices for controlling the inflation and deflation of air bag cushions for such systems.

In the design of inflatable occupant restraint systems for automotive vehicles, it is customary to provide a flexible bag that is arranged in fluid communication with a gas generating device or a source of gas under pressure to expand from some folded or stored position remote from a vehicle occupant to an expanded position in which the occupant's motion is cushioned. This inflating process necessarily happens rather rapidly in the functioning of such systems, occurring in a time on the order of 0.060 seconds. The cushioning effect of such systems is enhanced by the controlled deflation of the bag from its fully inflated position in a predictable manner. This deflation is generally accomplished through the provision of outlet ports formed through the bag which direct a portion of the pressurized inflating fluid to the atmosphere. It is known to provide "on-off" valve mechanisms at these outlet ports. U.S. Pat. No. 4,243,822 to Lipkin is exemplary of this broad approach. It is also known to provide apertures through the bag which are covered by a gas permeable cloth such as is disclosed in U.S. Pat. No. 4,097,065 to Okada et al. and U.S. Pat. No. 4,181,325 to Barnett. Even further, it is known to provide blow-out patches over air bag discharge ports which will rupture upon appropriate inflation. U.S. Pat. No. 3,580,603 to Chute et al. and U.S. Pat. No. 3,762,741 to Fleck et al. are exemplary of such approaches.

A common disadvantage of all of the prior art teachings in regard to the handling of discharge gas flow out of an air bag is that none provide a control of the flow responsive to changes in pressure within the bag and in flow out of the bag to provide for any variable control of discharge flow. In addition, the predictability and repeatability of the prior art fixed closures for discharge ports, such as the blow-out patches previously mentioned may be less than desirable for certain designs.

SUMMARY OF THE INVENTION

Responsive to the disadvantages of the prior art, it is an object of the present invention to provide an improved air bag for an automotive inflatable occupant restraint system which includes a discharge port formed through the bag and a valve connected to the bag, which includes closure members which are reversibly movable between a position closing the discharge port and a position opening the discharge port in response to the pressurization of the bag.

According to a feature of the present invention, such an improved bag is provided with a valve which includes a base portion secured to the bag, a support portion carried within the base and closure members mounted for pivotal movement with respect to the bag.

BRIEF DESCRIPTION OF THE DRAWINGS

These and other objects and features will become apparent to those skilled in the inflatable occupant restraint arts upon reading the following description with reference to the accompanying drawings in which FIG. 1 is a perspective view of the interior of an automotive vehicle in which an improved air bag according to the present invention is deployed to protect an occupant;

FIG. 2 is an enlarged view of a portion of the improved air bag showing an elevational view of its valve;

FIG. 3 is a cross-sectional view taken along lines 3—3 of FIG. 2;

FIGS. 4-10 are views similar to FIG. 2 showing elevational views of alternative embodiments of the valve;

DESCRIPTION OF THE PREFERRED EMBODIMENTS

Figure 5:
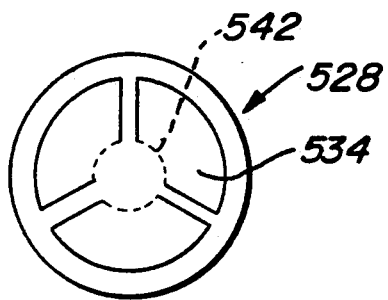
Figure 6:
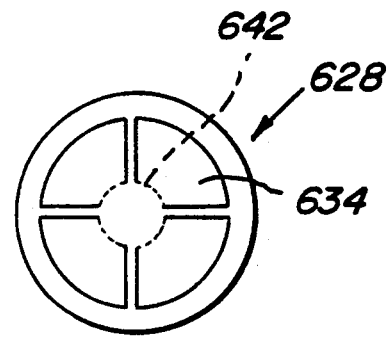

Turning now to the drawings and in particular to FIG. 1 thereof, an automotive vehicle indicated generally at 10 is illustrated as including within its passenger compartment 12 a seat assembly 14 for supporting an occupant 16 in a position behind a steering wheel 18 in which is installed an inflatable occupant restraint indicated generally at 20. It will be appreciated by those skilled in the art that the inflatable occupant restraint system 20 includes a gas generator or other source of inflating gas positioned internally of the steering wheel 18, as well as some control system for sensing the occurrence of an impact of predetermined magnitude and duration for activating the source to direct a flow of inflating gas into an inflatable containment or air bag 22. For purposes of the present invention, the details of the design of the inflatable occupant restraint system 20 are not of importance beyond that it is to be understood that the air bag 22 has a flexible body 24 which defines an internal chamber 25 in fluid communication with the inflating gas source for inflating the body to the cushioning position shown in FIG. 1. The air bag 22 also includes at least one discharge port 26 formed through the body 24 as may best be seen in FIG. 3, and a valve 28 is connected to the body 24 to control flow out of the discharge port 26.

Turning now to FIG. 2, one preferred embodiment of the valve 28 is illustrated. The valve 28 is illustrated as including an annular base portion 30, a support portion 32 located centrally within the base portion 30 and a plurality of closures or flap members 34. The base portion 30 is formed as a ring-like structure and may be formed of any suitable material that may be affixed to the bag 28, such as by stitching as indicated at 36.

The support portion 32 in the FIG. 2 embodiment is illustrated as including diametrically extending braces 38, extending through a central section 40 for attachment to or integration with the base portion 30.

The flap members 34 are formed as truncated triangular members that are each hingedly connected as indicated at 42 to the support portion central part 40 at their truncating sides. As may best be seen in FIG. 3, the remaining sides of the flap member are free with respect to the support portion 32 to define apertures 44 accommodating the outward flow of inflating gas. In operation, the valve 28 of the embodiment of FIGS. 2 and 3 presents a valve arrayed at about the discharge port 26 of the air bag 22 which moves from a position in which the apertures 44 and hence, the discharge port 26, are closed to positions in which they are open in reversible fashion, as can be seen in FIG. 3. The flap members 34 are free to move pivotally outwardly with respect to the inflating interior 25 of the air bag 22, and the flaps may be chosen to be of a resilient construction such as by specifying the use of materials such as plastics, rubbers or metals to form the valve 28 or the flaps 34 so that when pressure in the chamber 25 reduces for any reason, such as the occurrence of cyclical impacts occurring during an accidental collision, the flaps 34 may move to or toward the closed position in which they would be essentially in positions coplanar with the air bag body 24 and the support portion 32.

It should be noted that in the embodiment described, the center portion 40 of the support portion 32 remains in the same plane as the air bag body 24 in the inflated state, as illustrated in FIG. 3. This, then, maintains the center of the discharge orifice through which flow is being controlled from the discharge port 26 in this same plane and accordingly, the size of the orifice is less affected by changes in pressure during inflation and deflation of the air bag 22. The effective variable orifice controlling the flow out of the discharge port 26 is the summation of the orifices defined by the flap members 34 which open from their outer periphery being hingedly connected to the central portion 40.

As can be seen in FIGS. 4-15, alternative shapes may be chosen for the flap members, such as the members 34. In the following descriptions of alternative embodiments the reference numerals of the FIG. 2 embodiment preceded by the corresponding Figure number designate like parts.

In FIG. 4, an alternative embodiment 428 of the valve is illustrated as including a base portion 430 and a pair of semi-circular flap members 434 joined to a brace portion 438 through hinge connections 442 formed at the straight side of the semi-circular flap 434.

FIG. 5 illustrates a valve 528 which includes hinge connections 542 and flap members 534 which differ from the flaps 434 of the FIG. 4 embodiment in that they are fewer in number. Similarly, the FIG. 6 embodiment illustrates a valve 628 having hinge connections 642 and flap members 634 which are four in number.

Figure 7:
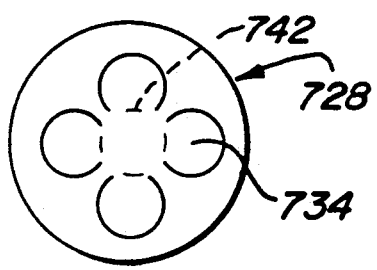
Figure 8:
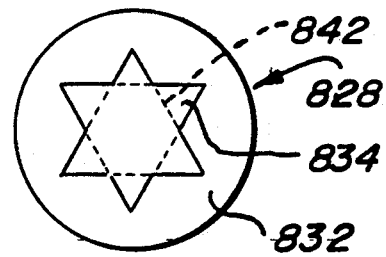
Figure 9:
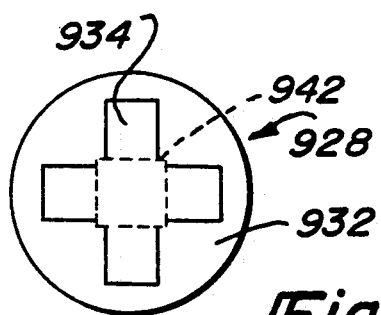
Figure 10:
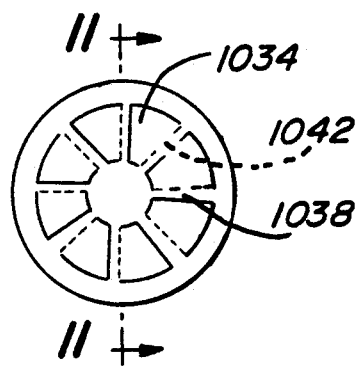
Figure 11:
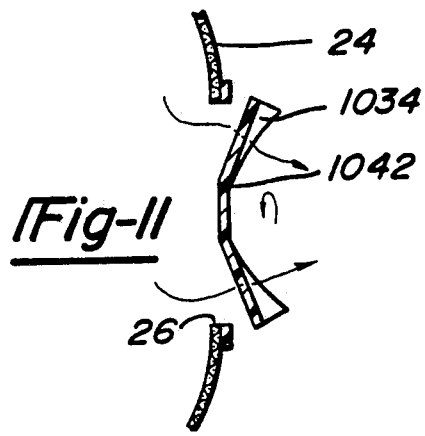
FIG. 11 is a cross-sectional view taken along line 11—11 of FIG. 10.

Turning next to FIG. 7, an alternative valve member 728 is illustrated as including a plurality of flap members 734 of substantially circular configuration which are hingedly supported by hinge connection 742 along the chordal sides of the flap member 734. The FIG. 8 embodiment, on the other hand, illustrates an alternative embodiment of the valve designated 828, which includes a plurality of triangular flap members 834 hingedly connected as indicated at 842 to the support portion 832 along the inner side of each of the triangularly shaped flap members 834. FIG. 9 illustrates yet another alternative configuration, designated 928, in which square flap members 934 are hingedly connected as indicated at 942 to the support portion 932 on the radially inner sides of the flap members 934.

Figure 12:
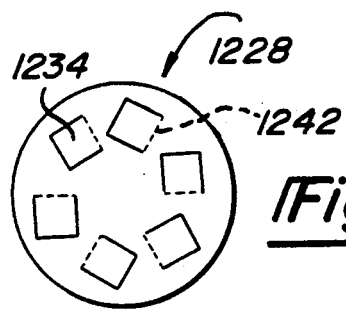
FIGS. 12-14 are views similar to FIG. 2 showing elevational views of further alternative embodiments of the valve.
Figure 13:
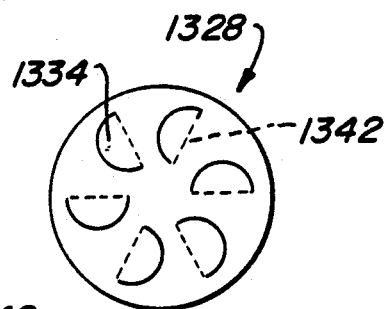

In all of the alternative embodiments heretofore described, it will be noted that the valve constructions are provided with flap members that are hingedly connected to a central portion of the support portion of the valve and the flap members open pivotal fashion at their outer peripheral edges. It will be understood that the flap members may also be arranged as indicated in FIGS. 10-13 so that the flap members open in a circumferentially extending direction by effecting the hinged connection of the flap members along radially extending axes. In the FIG. 10 embodiment, the flap members 1034 are shaped essentially identically with the FIG. 2 embodiment, but the hinged connection 1042 is effected along radially extending axes with the brace portions 1038. FIGS. 12 and 13 illustrate alternative embodiments for the valves 1228 and 1328, respectively, similar to the FIG. 10 embodiment, but in which the flap members 1234 are of square configuration and the flap members 1334 are of semi-circular configuration. The flap members 1234 and 1334 are joined to the brace portion through hinge connections 1242 and 1342 respectively.

Figure 14:
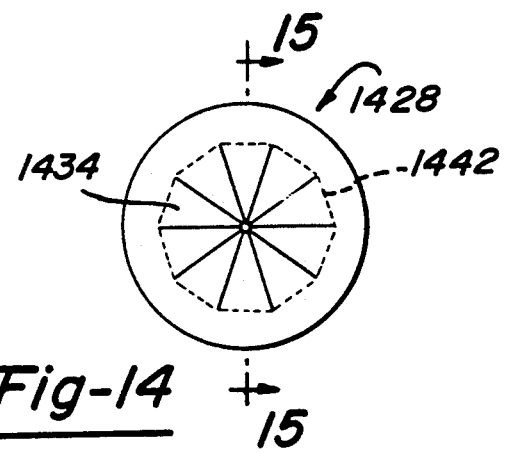
Figure 15:
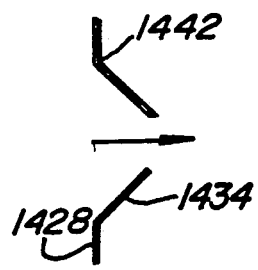
FIG. 15 is a cross-sectional view taken along line 15—15 of FIG. 14.

Considering lastly the alternative embodiment for the valve members of FIGS. 14 and 15, it will be appreciated that centrally opening configurations for flap member such as the flap members 1434 may also be chosen. The flap members 1434 are illustrated in FIG. 14 as comprising triangular shaped members, which hingedly connected as indicated at 1442 at their radially outer sides so that pivotal movement of the flaps 1434 under the influence of fluid pressure from the inflating air bag 22 effects movement of flaps 34 from a closed position, as shown in FIG. 14, to an opened position, a shown in the cross-sectional view of FIG. 15. This is essentially equivalent to the formation of a relatively large orifice with local discontinuities created from the overlying portions of the flap members 1434 in the stream of discharging gas. Such an orifice will have a substantially different discharge coefficient than that of the previously described alternative embodiments and the provision of such an alternative permits a flexibility in the overall design for the deflation of the inflated air bag than would be possible without the provision of such alternative embodiments. Other shapes may be chosen for the centrally opening flaps 1434 and the flaps may be interconnected to assure simultaneous movement and to enhance closure.

While certain embodiments of the improved air bag system of the present invention have been disclosed, others will occur to those skilled in the inflatable occupant restraint arts that can be accomplished without departing from the scope of the following claims.

We claim:

1. An improved air bag for an automotive inflatable occupant restraint system of the type having a source of inflating gas connected to the air bag for pressurization thereof, the air bag comprising:
   a flexible body portion having an internal chamber in fluid communication with the inflating gas source;
   a discharge port formed through said body portion for directing said gas out of said chamber to the atmosphere; and
   a valve comprising:
   an annular base portion fixedly secured to said body portion;
   a centrally located support portion positioned within said base portion;
   a plurality of apertures formed through said support portion in circumferentially spaced relationship; and
   a plurality of flap members hingedly connected to said support portion for movement between a position enclosing said discharge port and positions opening said discharge port in response to the pressurization of said chamber.

2. An improved air bag as defined in claim 1, wherein said central support portion comprises brace means extending diametrically across said base portion.

3. An improved air bag as defined in claim 2, wherein said flap members comprise a plurality of truncated triangular members hingedly connected to said support portion at the truncating side thereof.

4. An improved air bag as defined in claim 2, wherein said flap members comprise a pair of semi-circular members hingedly secured to said brace means at the straight side of said semi-circular members.

5. An improved air bag as defined in claim 2, wherein said flap members comprise a plurality of substantially circular members hingedly secured to said support portion.

6. An improved air bag as defined in claim 2, wherein said flap members comprise a plurality of triangular members hingedly secured to said support portion along a side of said triangular members.

7. An improved air bag as defined in claim 2, wherein said flap members comprise a plurality of square members hingedly secured to said support portion along a side of each of said square members.

8. An improved air bag as defined in claim 2, wherein said flap members comprise a truncated triangular member hingedly connected along a radially extending axis to said brace means.

9. An improved air bag as defined in claim 2, wherein said flap members comprise a plurality of square members hingedly connected along a radially extending axis to said brace means.

10. An improved air bag as defined in claim 2, wherein said flap members comprise a plurality of semi-circular members hingedly connected along a radially extending axis to said brace means.

* * * * *